H. A. WRIGHT AND C. W. KENNEDY.
AUTO SIGNALING DEVICE.
APPLICATION FILED SEPT. 18, 1919.
1,379,503.
Patented May 24, 1921.
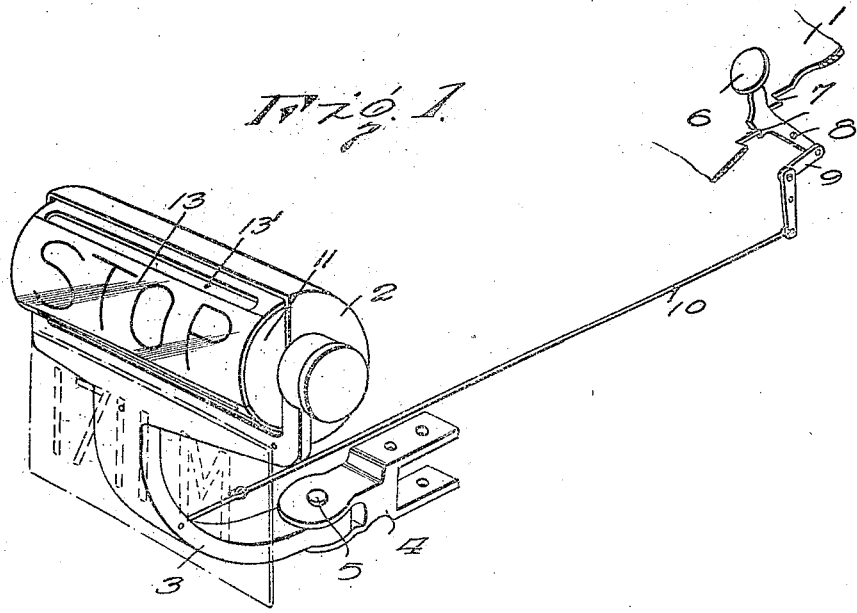
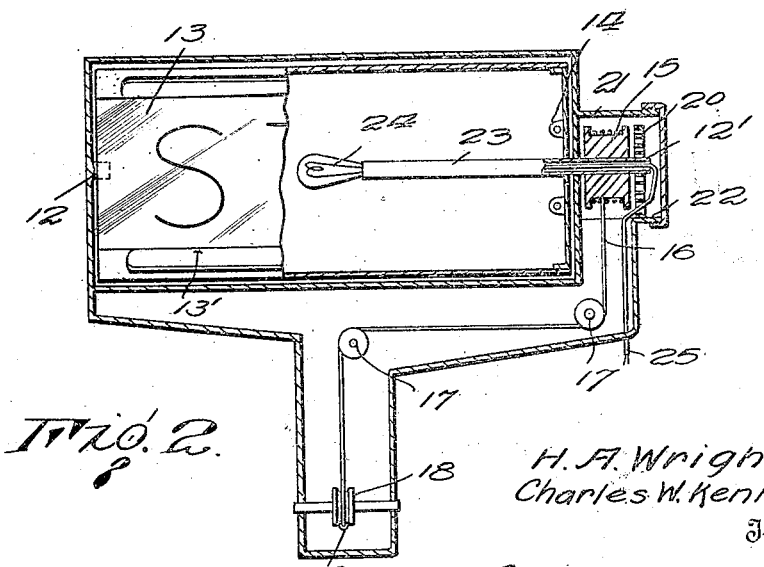
H. A. Wright
Charles W. Kennedy
Inventor
By Geo. F. Kimmel
Attorney

UNITED STATES PATENT OFFICE.

HERBERT A. WRIGHT, OF CLARENCE, MISSOURI, AND CHARLES W. KENNEDY, OF BENTON, MONTANA.

AUTO SIGNALING DEVICE.

1,379,503.          Specification of Letters Patent.          Patented May 24, 1921.

Application filed September 18, 1919. Serial No. 324,305.

*To all whom it may concern:*

Be it known that we, HERBERT A. WRIGHT and CHARLES W. KENNEDY, citizens of the United States, and residents of Clarence, in the county of Shelby and State of Missouri, and Benton, in the county of Chouteau and State of Montana, have invented certain new and useful Improvements in Auto Signaling Devices, of which the following is a specification.

This invention relates to direction indicators for vehicles and it is the principal object of the invention to provide a direction indicator whereby the operator of the vehicle can signal following or approaching vehicles and pedestrians, the course in which a vehicle is about to be steered, thereby allowing the regulation of traffic and reducing the liability of accidents and collisions to a minimum.

It is also an object of the invention to provide a novel indicator capable of being attached to the rear end of a vehicle and having a changeable exhibitor arranged in the same, said exhibitor being operated at will by the vehicle driver whereby to cause displaying of the matter carried by the exhibitor.

Among other aims and objects of the invention may be recited the provision of a signal of the character mentioned with a view to compactness and in which the number of parts are few, the construction simple, the cost of production small, and efficiency and operation high.

The improvements in the details and arrangement of parts will be apparent from an inspection of the accompanying drawings, in connection with the specific description hereinafter contained, and wherein the preferred embodiment of the invention is disclosed for the purpose of imparting a full understanding of the same.

In the drawings:

Figure 1 is a longitudinal section through a vehicle having our improved direction indicator arranged thereon; and Fig. 2 is a vertical section through the indicator, parts thereof being shown in elevation.

Having more particular reference to the drawings, 1 represents a portion of a motor driven vehicle having the improved indicator arranged upon the rear end thereof, the indicator including a semi-cylindrical hood 2, having a hollow curved bracket 3 engaged with the opposite ends thereof, said bracket in turn, being pivotally engaged with a second bracket 4 as at 5, which bracket is fixedly secured to the rear spring of the motor driven vehicle.

A foot pedal 6 is arranged in the forward portion of the vehicle body flooring and, as shown in Fig. 1 passes through a slot formed therein having a series of serrations 7 formed upon one side thereof. The lower extremity of the pedal 6 is pivotally mounted upon a suitable support as at 8 and is engaged with a link 9, this link having communication with an operating rod 10 extending longitudinally of the vehicle body to a point in proximity of the indicator.

Rotatably mounted in the semi-cylindrical hood 1 is a drum indicated in its entirety by the numeral 11, the said drum having trunnions 12 and 12′ arranged concentrically of the cylindrical end pieces thereof, it being noted that the trunnion 12′ is elongated and hollow. The trunnions 12 and 12′, of course, are arranged in suitable bearings in opposite ends of the hood 1. Transparent panes 13 are secured to apertured ears 14 formed adjacent the peripheral edges of the end pieces 11 and have descriptive matter painted or otherwise arranged thereon, the said matter consisting of the words "Stop" and "Slow" or the like. Slots 13′ are formed in the several panes 13 and, as will be obvious, permit the unobstructed passage of light therethrough.

Keyed upon the hollow trunnion 12′ is a secondary drum 15 having one end of a cable 16 connected thereto and adapted to be arranged thereabout at times, the cable passing downwardly into the hollow curved bracket 3 over pulleys 17 and 18 rotatably supported therein and through an opening 19 into engagement with the adjacent end of the operating rod 10. A coil spring 20 is arranged about the extremity of the hollow trunnion 12′ having one end of the same secured thereto and the remaining end thereof secured to an annular extension or casing 21 formed integral with the bracket 3, as at 22. Obviously, by so engaging the coil spring 20, the drum 11 when rotated will place the spring under tension and as a consequence, will be returned to its normal position when released. The end of the casing 21 may be and preferably is screw threaded whereby a cap 22 may be turned into engagement therewith.

Communicating with and secured to the hollow trunnion 12' is a conduit 23 having an electrical lamp socket arranged in its outer end in order that a lamp 24 may be placed therein. To supply energy to the lamp, electrical conductors 25 are passed through an opening formed in the bracket 3 and through the trunnion 12' and conduit 23 into engagement with the terminals of the lamp socket.

In operation, the foot pedal 6 is depressed, thereby imparting a pull to the cable 16 by way of the communicating links and operating rod 10. In this way, the drum 11 will be caused to rotate to a point whereat the proper transparent pane 13 bearing the descriptive matter indicating the direction to be taken by the vehicle, will be displayed. Upon releasing the foot pedal, the drum will be immediately returned to its normal position to the medium of the spring 20.

Due to the positioning of the slots 13' in the panes 13, a clear undiffused light will be projected therethrough from the lamp 24 on to the license sign of the vehicle, which as shown in the Fig. 1, is secured to the bracket 3 directly beneath the semi-cylindrical hood 1.

The panes 13 may be of colored glass or the like, this rendering the same clearly visible in darkness and by reason of their coloring, direct attention thereto.

Manifestly, the construction shown is capable of considerable modification and such modification as is within the scope of our claim, we consider within the spirit of our invention.

We claim:

In a direction indicator a substantially T-shaped member, the head of which includes a semi-cylindrical hood with its flat portion open and facing rearwardly, the shank of said member being hollow and curved forwardly with its free end adapted for connection to an attaching bracket, an indicia carrying drum mounted to rotate in said hood, a spring winding drum connected with the indicia carrying drum to rotate it, a cable attached at one end to said spring drum to be wound thereon, pulleys mounted in said head and shank over which said cable passes, and actuating mechanism connected to unwind said cable to rotate said drum.

In testimony whereof, we affix our signatures hereto.

HERBERT A. WRIGHT.
CHARLES W. KENNEDY.